United States Patent [19]
Rozak et al.

[11] Patent Number: 5,748,191
[45] Date of Patent: May 5, 1998

[54] METHOD AND SYSTEM FOR CREATING VOICE COMMANDS USING AN AUTOMATICALLY MAINTAINED LOG INTERACTIONS PERFORMED BY A USER

[75] Inventors: Michael J. Rozak, Issaquah; James H. Spoltman, Snohomish, both of Wash.

[73] Assignee: Microsoft Corporation, Redmond, Wash.

[21] Appl. No.: 508,388

[22] Filed: Jul. 31, 1995

[51] Int. Cl.$^6$ .................................................. G06F 3/00
[52] U.S. Cl. .................................. 395/333; 395/978
[58] Field of Search .............................. 395/155–161, 395/333, 339, 349, 978; 364/472.22, 474.23

[56] References Cited

U.S. PATENT DOCUMENTS

| | | | |
|---|---|---|---|
| 4,509,133 | 4/1985 | Monbaron et al. | 364/513 |
| 4,677,569 | 6/1987 | Nakano et al. | 364/513 |
| 4,704,696 | 11/1987 | Reimer et al. | 364/513 |
| 4,766,529 | 8/1988 | Nakano et al. | 364/513 |
| 4,776,016 | 10/1988 | Hansen | 381/42 |
| 4,783,803 | 11/1988 | Baker et al. | 381/42 |
| 4,827,520 | 5/1989 | Zeinstra | 381/43 |
| 4,864,623 | 9/1989 | Van Nes et al. | 381/43 |
| 4,866,778 | 9/1989 | Baker | 381/43 |
| 4,903,012 | 2/1990 | Ohuchi | 340/709 |
| 4,931,950 | 6/1990 | Isle et al. | 364/513 |
| 4,987,411 | 1/1991 | Ishigami | 340/709 |
| 5,027,406 | 6/1991 | Roberts et al. | 381/43 |
| 5,075,675 | 12/1991 | Barker et al. | 340/721 |
| 5,157,384 | 10/1992 | Greanias et al. | 340/706 |
| 5,231,691 | 7/1993 | Yasuda | 395/2 |
| 5,255,341 | 10/1993 | Nakajima | 395/2 |
| 5,265,202 | 11/1993 | Krueger et al. | 395/158 |
| 5,357,596 | 10/1994 | Takebayashi et al. | 395/2.84 |
| 5,384,910 | 1/1995 | Torres | 395/156 |
| 5,386,494 | 1/1995 | White | 395/2.84 |
| 5,404,458 | 4/1995 | Zetts | 395/275 |
| 5,408,582 | 4/1995 | Colier | 395/2.52 |
| 5,425,141 | 6/1995 | Gedye | 395/157 |
| 5,444,617 | 8/1995 | Merialdo | 364/419.1 |
| 5,448,695 | 9/1995 | Douglas et al. | 395/155 |
| 5,465,378 | 11/1995 | Duensing et al. | 395/800 |
| 5,519,809 | 5/1996 | Husseiny et al. | 395/284 |
| 5,566,248 | 10/1996 | Ulrich | 382/187 |
| 5,590,264 | 12/1996 | Keane et al. | 395/340 |
| 5,602,981 | 2/1997 | Hargrove | 395/352 |
| 5,617,526 | 4/1997 | Oran et al. | 395/326 |

OTHER PUBLICATIONS

Schmandt, Chris et al., "Augmenting a Window System with Speech Input," *Computer,* vol. 23(8), pp. 50–56, Aug., 1990.

Borgen et al., Voice Navigator™ Owner's Guide, *Articulate Systems, Inc.,* pp. 4, 11, 12, 25–27, 43 and 44, 1990.

Software User's Guide—Microsoft® Windows™ Sound System, Version 2.0, Part 2, pp. 28–56, Part 3, pp. 59–70, 1993.

"Integrated Audio–Graphics User Interface," IBM Technical Disclosure Bulletin, vol. 33(11), pp. 368–371, Apr., 1991.

Kurzweil, "Kurzweil Brings Voice Dictation to Windows," BYTE, vol. 19(8):48, Aug., 1994.

Meisel, William S., "Talk to Your Computer," BYTE, vol. 18(11): 113, Oct., 1993.

Microsoft Corporation, User's Guide, Microsoft® Word, Version 6.0, pp. 72–73, 1993–1994.

*Primary Examiner*—Raymond J. Bayerl
*Assistant Examiner*—A. Katbab
*Attorney, Agent, or Firm*—Seed and Berry LLP

[57] ABSTRACT

A method and system for creating voice commands using an automatically maintained log of interactions by a user is provided. In a preferred embodiment, a voice command creation facility maintains a log containing indications of interactions performed by the user. When the facility receives an instruction from the user to create a command, the facility displays at least a portion of the log. The facility then receives user input identifying interactions whose indications are displayed in the log that are to be automatically repeated when the created command is invoked, and creates a command that automatically repeats the identified interactions when invoked.

19 Claims, 15 Drawing Sheets

Rehab Status Report last updated 7/15/95

| project | projected completion date | last activity | last activity date | status |
|---|---|---|---|---|
| kitchen cabinets | 7/10/95 | mount cabinets | 7/8/95 | completed |
| replace stove | 8/12/95 | order stove | 6/12/95 | awaiting arrival of stove |
| reseal windows | 8/5/95 | remove weather-stripping | 7/15/95 | in progress |

*Fig. 15*

METHOD AND SYSTEM FOR CREATING VOICE COMMANDS USING AN AUTOMATICALLY MAINTAINED LOG INTERACTIONS PERFORMED BY A USER

TECHNICAL FIELD

The invention relates generally to the field of voice-controlled computers, and, more specifically, to the field of voice command generation.

BACKGROUND OF THE INVENTION

Users of modern computer systems may interact with computer systems in several ways. If a computer has a keyboard input device, users may interact with the computer by typing on the keyboard. If a computer has a pointing input device, such as a mouse, users may interact with the computer by clicking the mouse while a mouse cursor whose position is controlled by the position of the mouse is at particular location on the computer system's display. The above-described lower-level user interactions may be used to perform higher-level user interactions, such as selecting a menu item from a menu, interacting with dialog boxes, or calling a macro or application programming interface (API) routine.

It is common for users to periodically repeat fairly complex behaviors comprised of an ordered sequence of specific user interactions as described above in order to achieve desired results. For example, a sequence of several such interactions is required to open a file in read-only mode using a word processing application program. Because manually performing the sequence of user interactions that comprise a commonly repeated complex behavior involves significant redundant user activity, it would be preferable to provide a convenient way to provide for later efficient repetition of such a sequence of user interactions.

SUMMARY OF THE INVENTION

The present invention provides a method and system for creating a voice command that simulates a commonly-repeated sequence of user interactions using an automatically maintained log of interactions recently performed by a user. In a preferred embodiment, a voice command creation facility ("the facility") maintains a time-ordered log of the input interactions, such as keystrokes, mouse clicks and drags, and menu selections, recently performed by the user. After the user has performed interactions for which the user wishes to create a new command, the user invokes a special "create command from previous interactions" command preferably by speaking those or similar words. In response, the facility displays the interactions log and prompts the user to select the interactions from the interactions log for which the user wishes to create a new command. The facility further prompts the user to name the new command. The facility then creates a new command having that name and consisting of the interactions selected by the user. The user may thereafter use the name of the new command to invoke it with a single interaction, preferably speaking the name of the new command. When invoked, the new command performs the selected interactions.

BRIEF DESCRIPTION OF THE DRAWINGS

FIG. 15 is a screen diagram showing the execution of the script of the new "view status" voice command in response to its recognition.

DETAILED DESCRIPTION OF THE INVENTION

The present invention provides a method and system for creating a voice command that simulates a commonly-repeated sequence of user interactions using an automatically maintained log of interactions recently performed by a user. The invention is interoperable with a wide range of voice command recognition programs capable of executing commands stored in a voice command table in response to recognizing voice command names received by a voice input device. In a preferred embodiment, a voice command creation facility ("the facility") maintains a time-ordered log of the input interactions, such as keystrokes, mouse clicks and drags, context switches, and menu selections, recently performed by the user. After the user has performed interactions for which the user wishes to create a new command, the user invokes a special "create command from previous interactions" command, preferably by speaking those words. The facility is preferably configurable to permit the user to invoke the special command by speaking other words. In response, the facility displays the interactions log and prompts the user to select the interactions from the interactions log for which the user wishes to create a new command. The invention further prompts the user to name the new command. The invention then creates a new command having that name and consisting of the interactions selected by the user. The user may thereafter use the name of the new command to invoke it with a single interaction, preferably speaking the name of the new command. When invoked, the new command performs the selected interactions.

Figure 1:
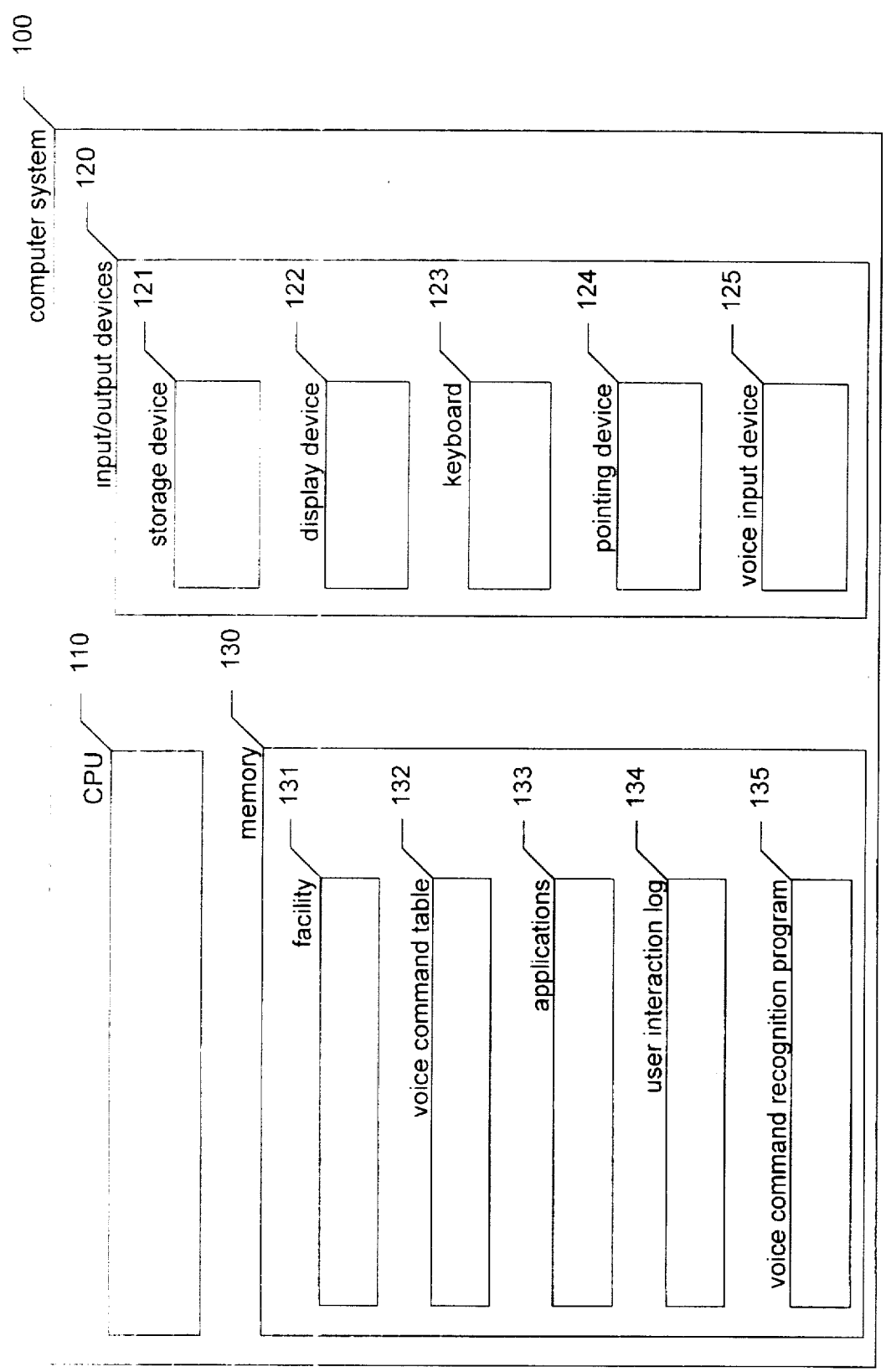
FIG. 1 is a high-level block diagram of the general-purpose computer system upon which the facility preferably operates.

FIG. 1 is a high-level block diagram of the general-purpose computer system upon which the facility preferably operates. The computer system 100 contains a central processing unit (CPU) 110, input/output devices 120, and a computer memory (memory) 130. Among the input/output devices is a storage device 121, such as a hard disk drive; a display device 122, such as a video monitor; a keyboard 123 for inputting text; a pointing device 124, such as a mouse; and a voice input device 125 for receiving audio data for recognition as voice commands, such as a microphone coupled with an audio input interface card containing an analog-to-digital converter for converting an analog audio signal from the microphone to digital form. The computer programs that preferably comprise the facility 131 reside in the memory 130 and execute on the CPU 110. The memory 130 also preferably contains a voice command table 132 containing information about each defined voice command; one or more application programs (applications) 133; a user interaction log 134 maintained by the facility to contain a list of recent user interactions; and a voice command recognition program 135 for executing commands stored in the voice command table 132 in response to recognizing voice command names received by the voice input device 125. While the facility is preferably implemented on a computer system configured as described above, one skilled in the art will recognize that it may also be implemented on computer systems having different configurations.

The operation of the facility is described in detail in conjunction with the discussion of an example that follows. FIGS. 2-5 are screen diagrams showing the user performing a sequence of interactions in order to open a file named "status.doc" in read-only mode using a word processing application among the applications 133, so that the user can view the contents of this file without changing them.

Figure 2:
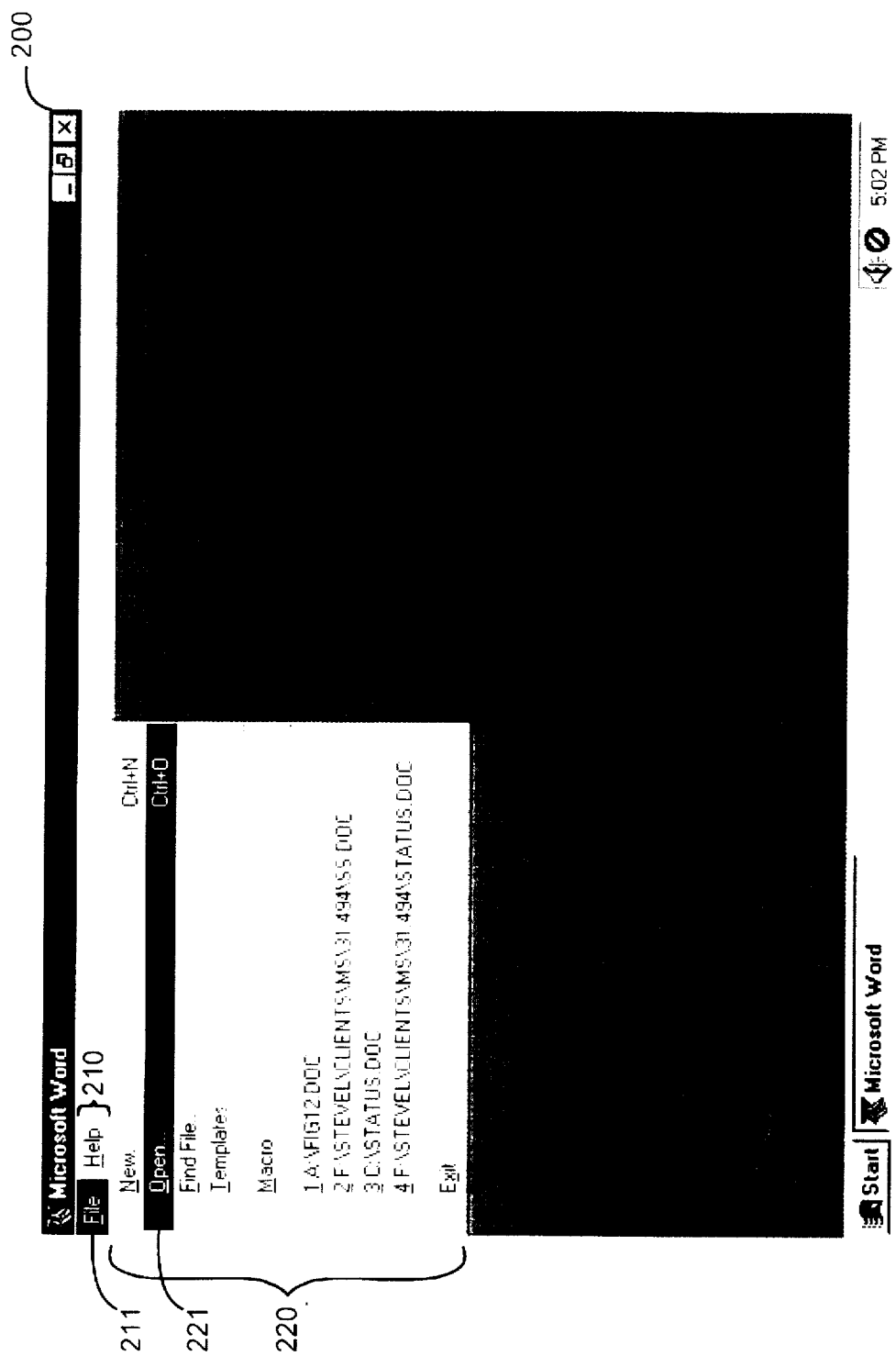
FIG. 2 is a screen diagram showing the user selecting an Open menu item from a File menu of the word processing application.

FIG. 2 is a screen diagram showing the user selecting an Open menu item from a File menu of the word processing application. The screen diagram shows that the word processing application displays a window 200 containing a menu bar 210. The user has selected a File menu title 211 from the menu bar 210. As a result, the word processing application has displayed a File menu 220 to allow the user to select actions relating to files containing documents. The diagram shows that the user is selecting an Open menu item 221 from the File menu 220 in order to open a word processing file.

Figure 3:
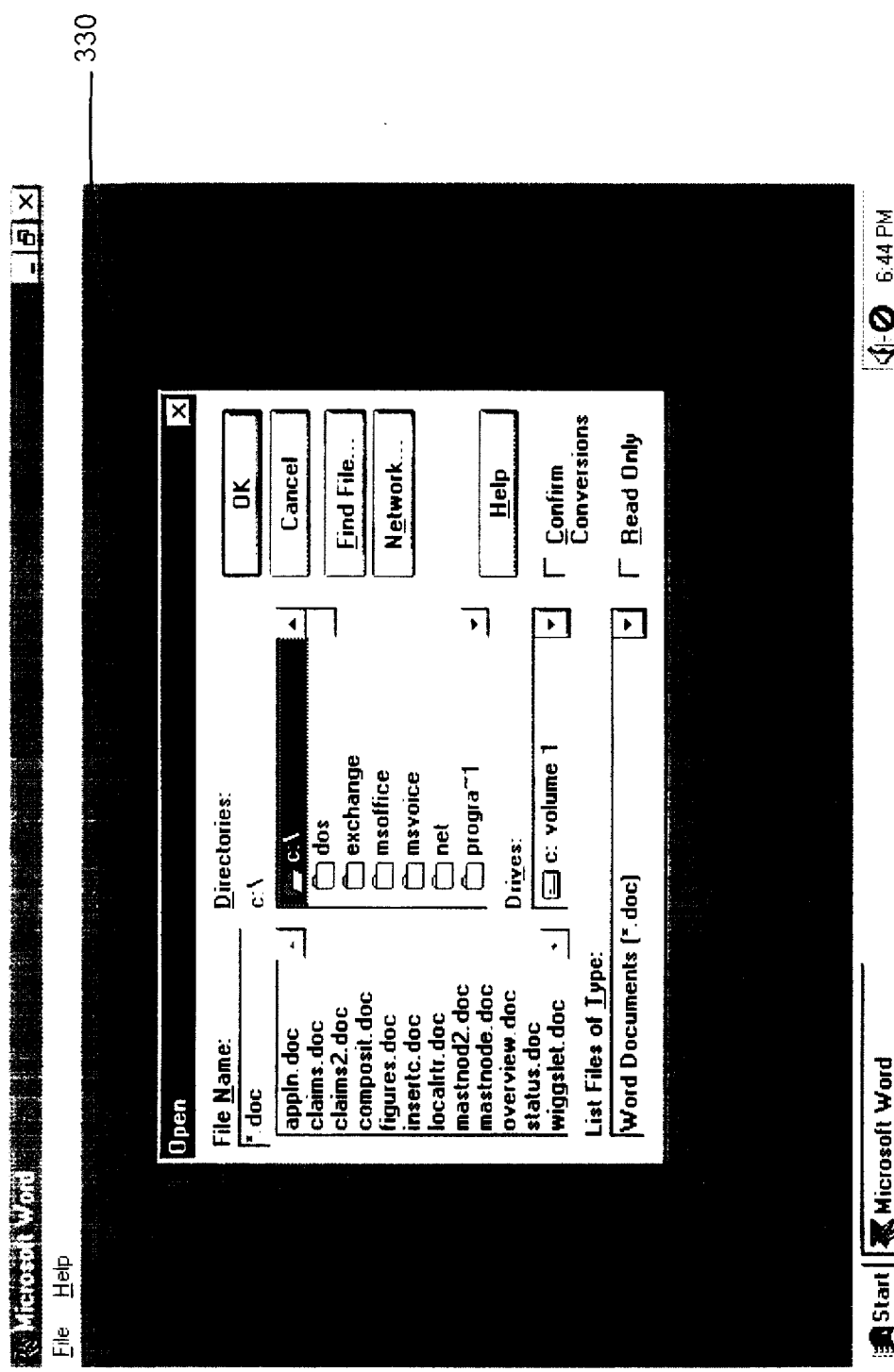
FIG. 3 is a screen diagram showing the display of an Open dialog box in response to the user's selection of the Open menu item.

FIG. 3 is a screen diagram showing the display of an Open dialog box 330 in response to the user's selection of the Open menu item 221. The Open dialog box permits the user to select a file for opening, as well as select values for options relating to opening the selected document.

Figure 4:
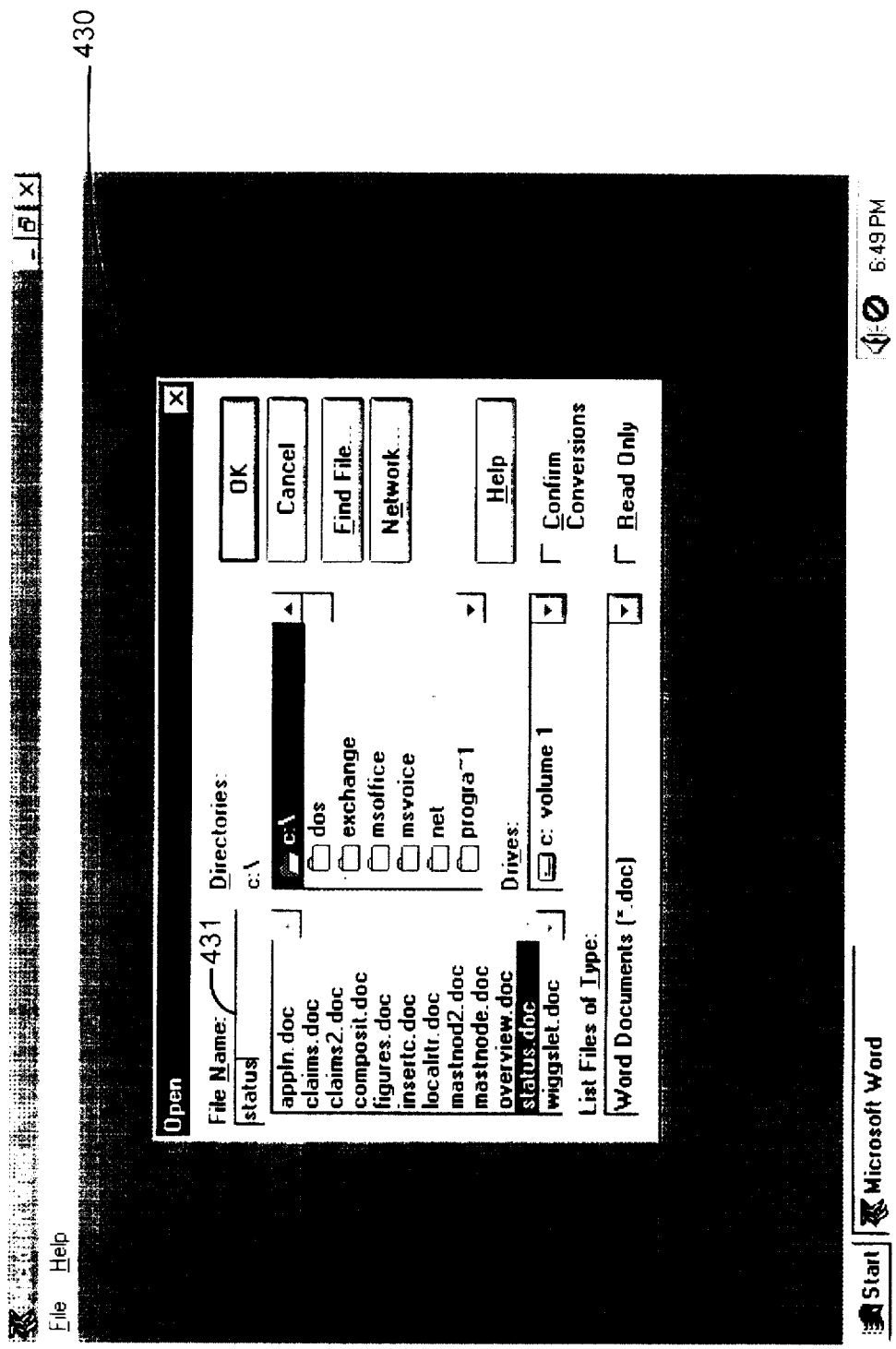
FIG. 4 is a screen diagram showing the user entering a name for the document to open in the Open dialog box.

FIG. 4 is a screen diagram showing the user entering a name for the file to open, in the Open dialog box 430. The diagram shows the user entering the file name open "status" in file name field 431. This entry will ultimately cause the word processing application to open the file named "status.doc".

Figure 5:
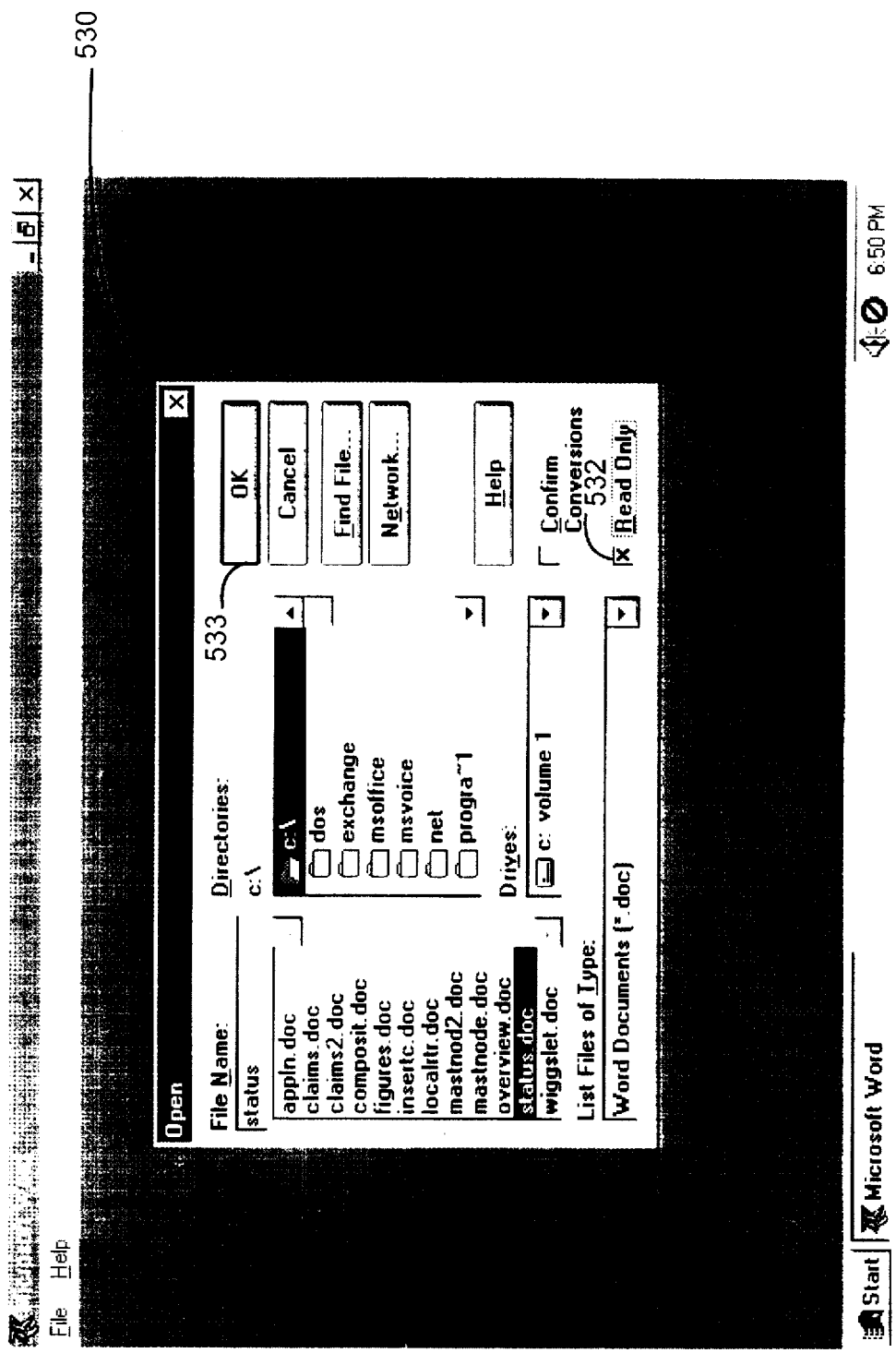
FIG. 5 is a screen diagram showing the user selecting a read-only mode 532 in the Open dialog box.

FIG. 5 is a screen diagram showing the user selecting a read-only mode 532 in the Open dialog box 530. Selecting the read-only mode will cause the word processing application to open the status file without permitting the user to modify the status file. At this point, if the user presses the enter key on the keyboard or uses the mouse to click on an OK button 533, the word processing application will open the status file using the read-only mode.

Figure 6:
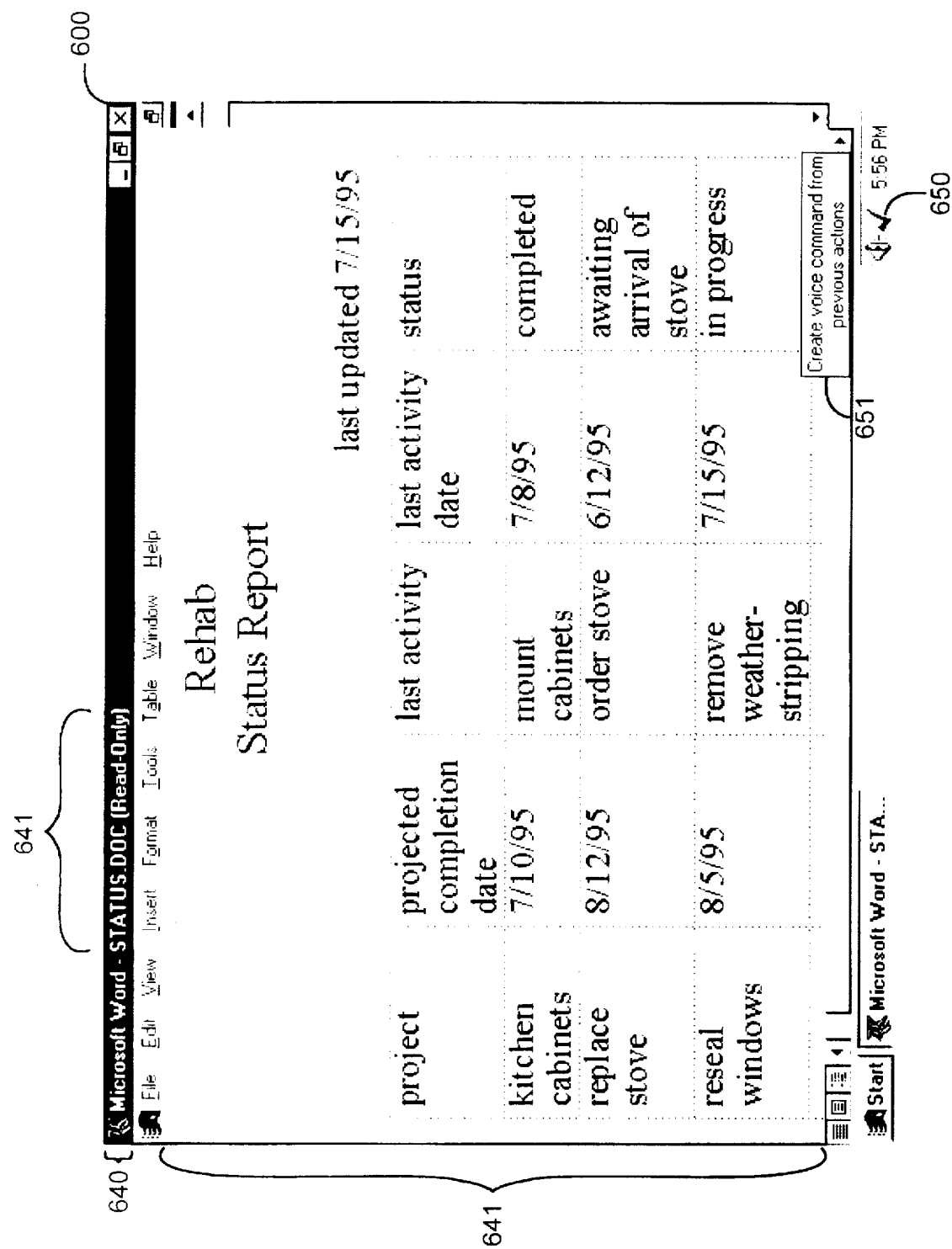
FIG. 6 is a screen diagram showing that the word processing application has opened the status document using the read-only mode in response to the user interactions shown in FIGS. 2–5.

FIG. 6 is a screen diagram showing that the word processing application has opened the status file using the read-only mode in response to the user interactions discussed above in conjunction with FIGS. 2-5. The diagram shows that the window 600 displayed by the word processing application now contains the contents 641 of the status file. It can further be seen from a designation 641 in the title bar 640 that the word processing program has opened the status file in read-only mode.

At this point, the user invokes the "create command from previous interactions" command. This command is preferably a voice command, invoked by the user by speaking the words "create command from previous interactions". FIG. 6 further shows that this voice command has been inputted and recognized. A "check mark" indicator 650 shows that the voice command recognition program 135 has recognized a voice command spoken by the user, and a rectangle 651 containing the text "create voice command from previous actions" identifies the particular voice command recognized. The user may preferably also invoke the "create voice command from previous actions" command by using the pointing device to select the command from a menu or by using a keyboard sequence.

Figure 7:
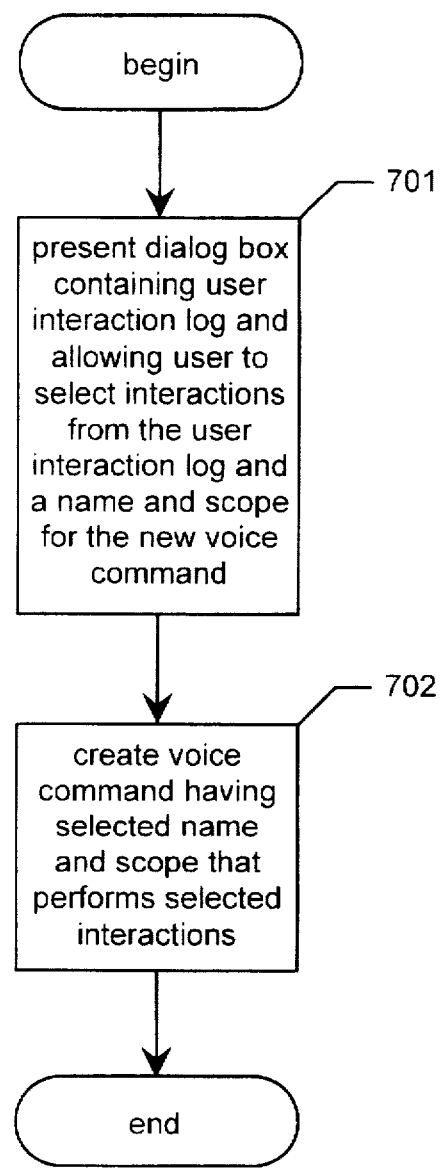
FIG. 7 is a flow diagram showing the steps preferably performed by the facility when the "create command from previous interactions" command is invoked.
Figure 8:
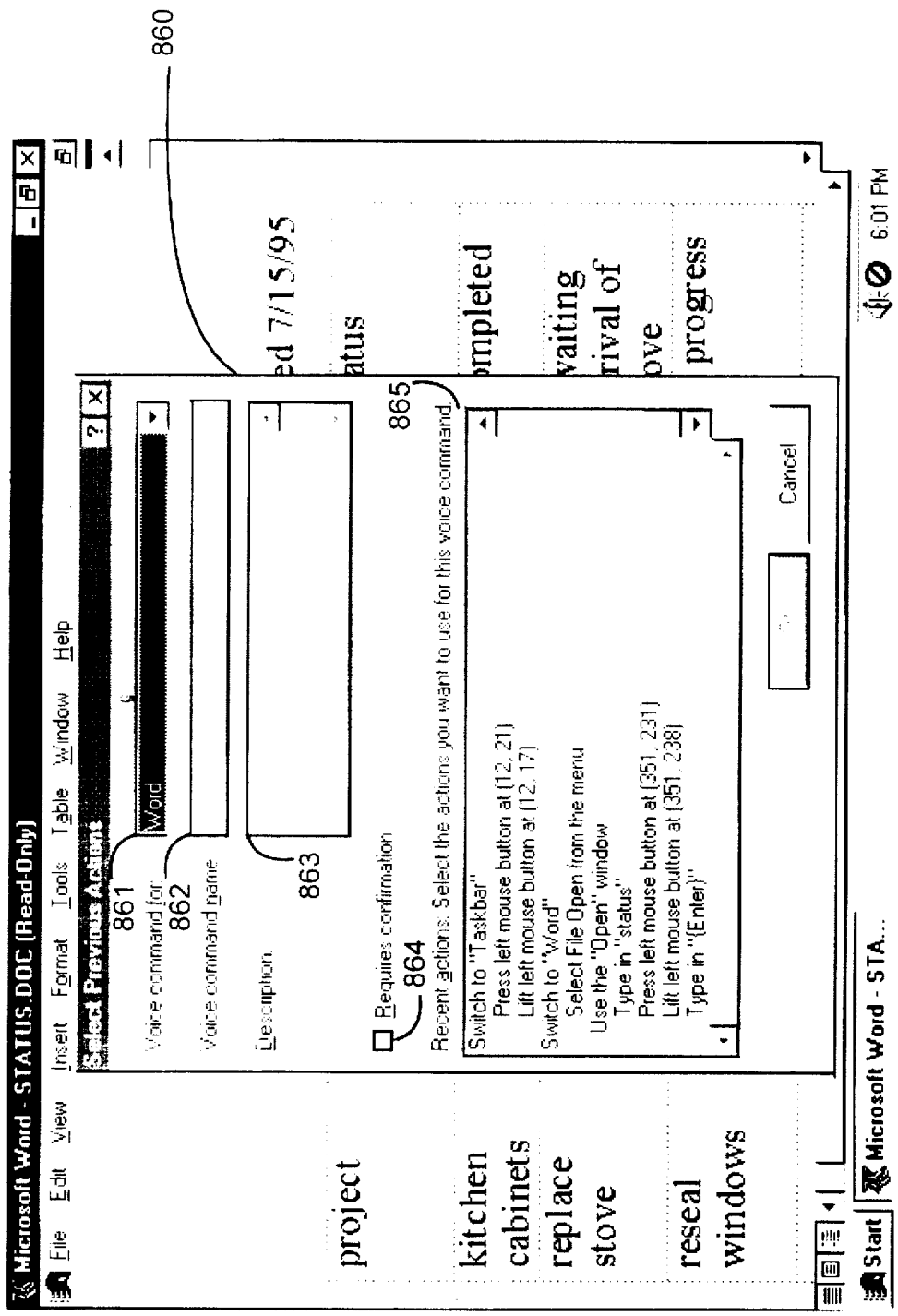
FIG. 8 is a screen diagram showing the voice command information dialog box.

FIG. 7 is a flow diagram showing the steps preferably performed by the facility when the "create command from previous interactions" command is invoked. In step 701, the facility presents a voice command information dialog box for creating a new voice command. FIG. 8 is a screen diagram showing the voice command information dialog box presented in step 701. The voice command information dialog box 860 displays the following pieces of information about the new command, discussed in greater detail below: a context field 861, a name field 862, a description field 863, a confirmation field 864, and a recent interactions list box 865. The context field 861 reflects the context in which the new voice command is available and will be recognized. In the context field 861, the user may preferably enter a context corresponding to any available application. Each such context is active when the application to which it corresponds is active. For example, the "Word" context shown corresponds to the word processing application and is active wherever the word processing application is the active application. The user may therefore speak the new voice command while the word processing application is the active application. The user could enter a context corresponding to a different application, allowing the new voice command to be spoken while that application is the active application. The user may preferably also enter a "global" context that is active any time voice command recognition is enabled.

The name field 862 reflects the name that the user can speak in order to invoke the new voice command. The description fields 863 optionally contains a description of the new voice command, which allows the user to more fully describe the purpose of the new voice command without making the new voice command name unduly long. The confirmation field 864 reflects whether the new voice command is executed directly upon invocation, or whether the user must confirm the invocation of the voice command before it is executed.

Figure 9:
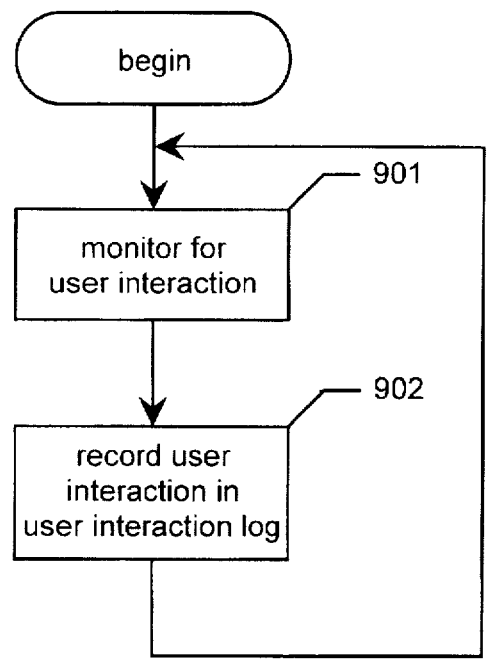
FIG. 9 is a flow diagram showing the steps preferably performed by the facility in order to maintain the user interaction log whose contents are displayed in the recent interactions list box.

The recent interactions list box 865 shows a log maintained by the facility of the most recent interactions performed by the user. The interactions are sorted by time, with the most recent interaction at the bottom of the list box. The user may select any of the interactions displayed in the recent interactions window 865 for inclusion in the new voice command. FIG. 9 is a flow diagram showing the steps preferably performed by the facility in order to maintain the user interaction log whose contents are displayed in the recent interactions list box 865. In step 901, the facility monitors for user interactions. These may preferably include changes in the active application, menu and window usage, typing, and mouse clicks and drags. User interactions are typically represented within the computer system as interprocess messages or as calls to application programming interface (API) routines of the operating system. In order to monitor for user interactions the facility preferably intercepts interprocess messages and API calls representing user interactions. The Microsoft® Windows® family of operating systems provide a special, well documented, hooking mechanism for intercepting user interaction events. Also, hooking Microsoft® Windows® API calls is described in detail in Finnegan, "Hook & Monitor Any 16-Bit Windows Function With Our ProcHook DLL," *Microsoft Systems Journal*, January, 1994, hereby incorporated by reference.

When a user interaction is detected, the facility continues in step 902 to record the user interaction in the user interaction log. If step 902 causes the size of the user interaction log to grow beyond a maximum number of interactions (preferably 100), then the facility preferably deletes the earliest user interaction recorded in the user interaction log (not shown). The facility then continues at step 901 to monitor for the next user interaction.

Figure 10:
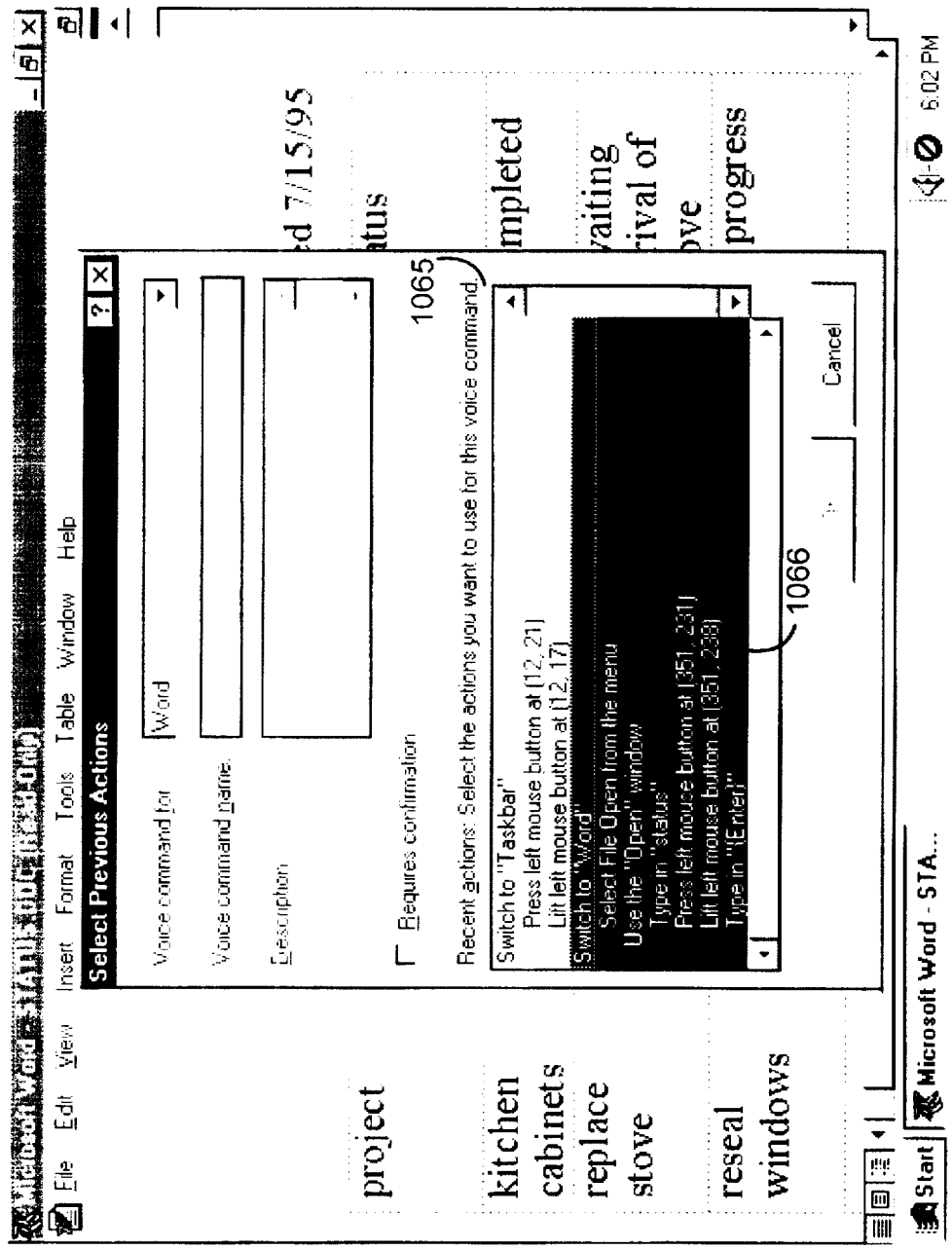
FIG. 10 is a display diagram showing the user selecting a group of user interactions from the recent interactions list box.
Figure 11:
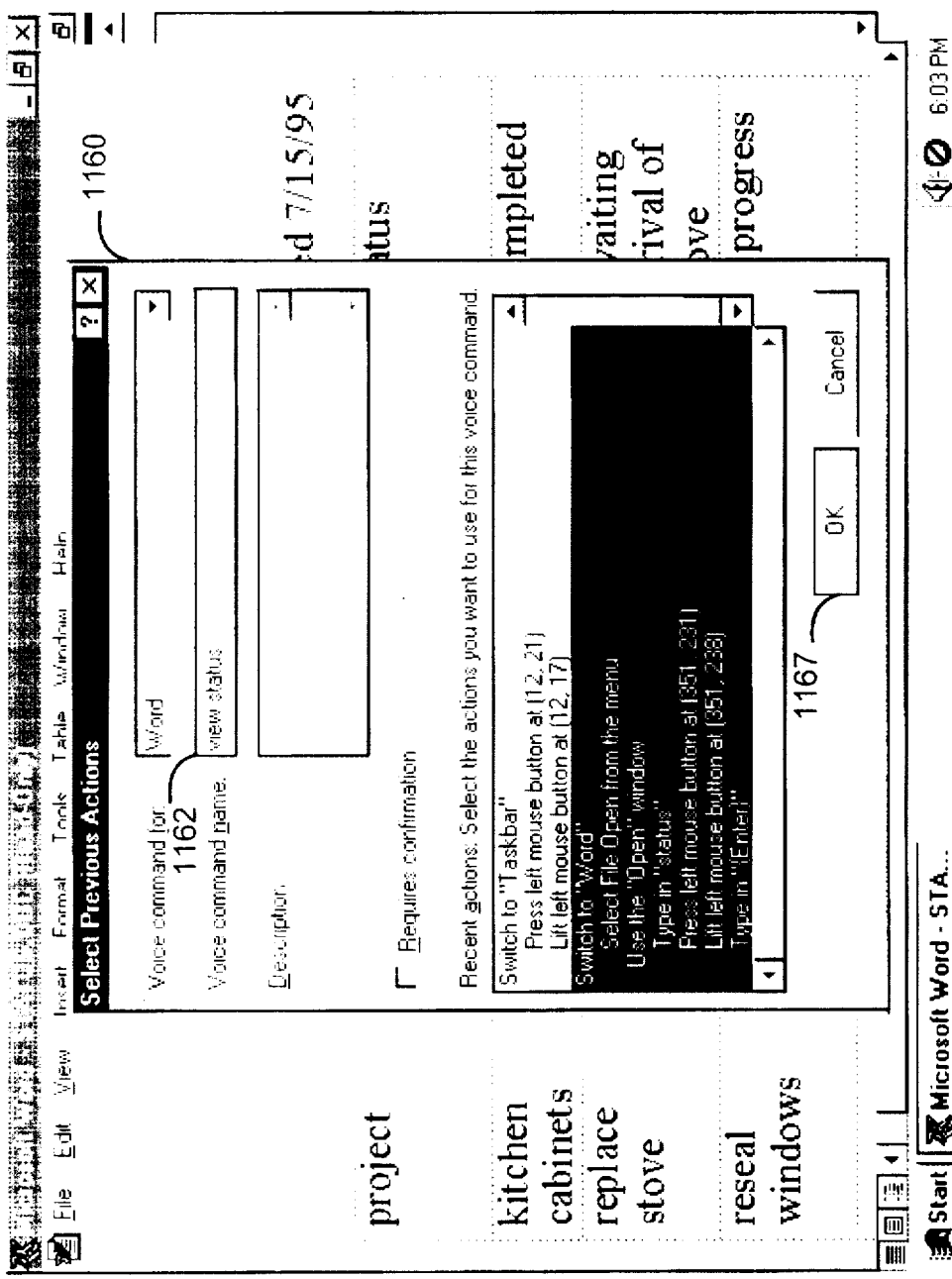
FIG. 11 is a display diagram showing the user entering a voice command name for the new voice command.
Figure 12:
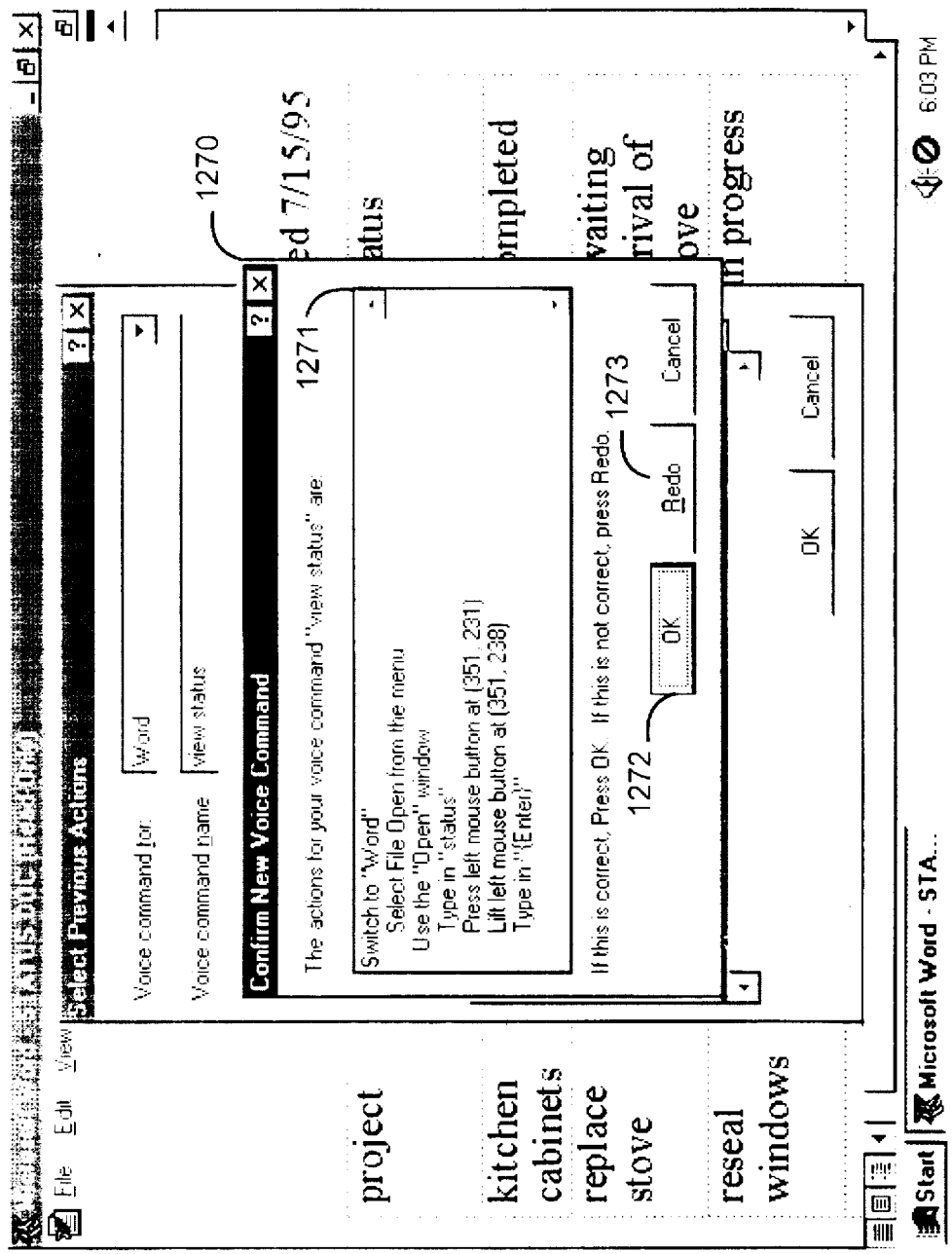
FIG. 12 is a display diagram showing the display of a user interaction confirmation dialog box.

The dialog box 860 presented in step 701 enables the user to select interactions from the user interaction log that will be repeated when the voice command is invoked, and to select a name and a context for the new voice command. FIGS. 10–12 show the user using the dialog box to make these selections. FIG. 10 is a display diagram showing the user selecting a group of user interactions 1066 from the recent interactions list box 1065. The selected interactions 1066 are those shown in FIGS. 2–5. This selection will cause the interactions shown in FIGS. 2–5 to be repeated each time the new voice command is invoked.

FIG. 11 is a display diagram showing the user entering a voice command name for the new voice command. FIG. 11 shows the user entering voice command name "view status" in the voice command name field 1162. This selection will cause the new command to be invoked when the user speaks the words "view status" while the context entered in context field 861 is active. The user may finish selecting information relating to the new voice command by using the mouse to click on an OK button 1167.

FIG. 12 is a display diagram showing the display of a user interaction confirmation dialog box 1270 is displayed in response to the user using the mouse to click on the OK button 1167 in the Open dialog box 1160, and contains a list box 1271 showing the user interactions selected by the user from the recent interactions list box 1065. In response to the display of the user interaction confirmation dialog box 1270, the user may click an OK button 1272 to accept the selected user interactions, or may press a redo button 1273 to redisplay the dialog box 1160 in order to modify the list of selected user interactions.

Returning to FIG. 7, when the user presses the OK button 1272, the facility continues at step 702. In step 702, the facility creates a voice command that performs the user interactions selected by the user. The created voice command has the voice command name selected by the user in field 1162 and the context selected by the user in field 861.

Figure 13:
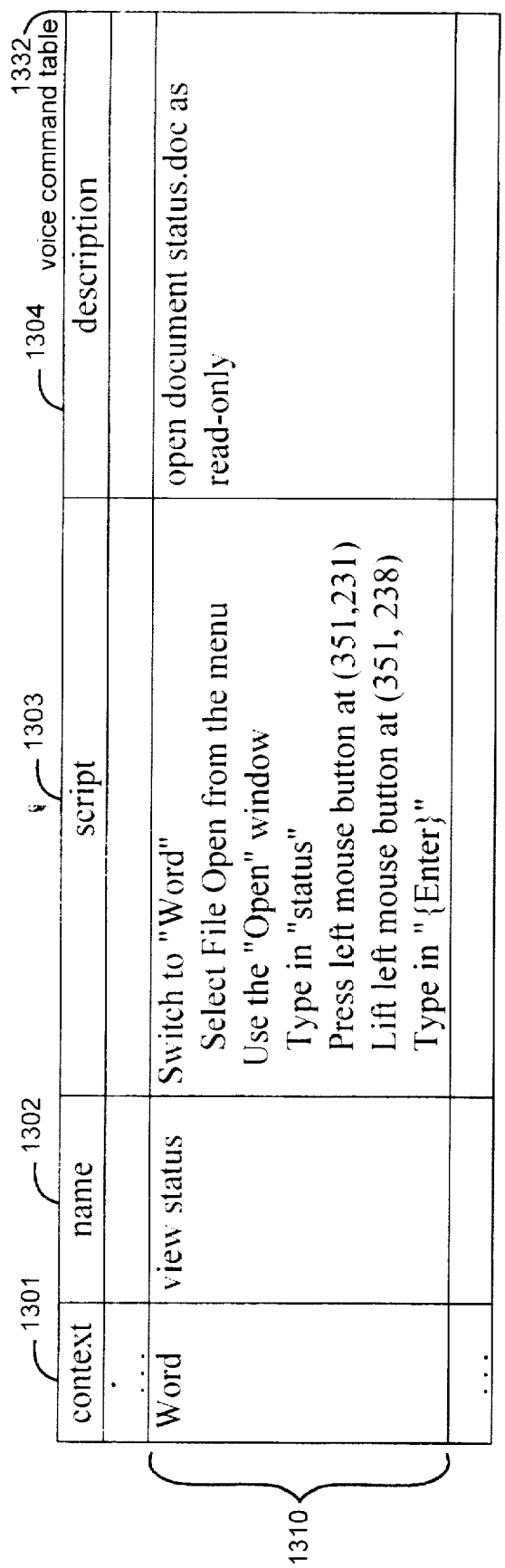
FIG. 13 is a table diagram showing the voice command table containing an entry inserted for the new "view status" command.

The facility preferably performs steps 702 by inserting a new voice command in the voice command table 132. FIG. 13 is a table diagram showing the voice command table containing an entry inserted for the new "view status" voice command. As discussed above, the voice command table 132 contains an entry for each voice command that may be recognized and executed by the voice command recognition program 135. The voice command table 1332 (which corresponds to the voice command table 132 shown in FIG. 1) is comprised of the following columns: a context column 1301 containing, for each voice command, the name of the context in which the new voice command is available and will be recognized; a name column 1302 containing the name that the user can speak in order to invoke each voice command; a script column 1303 containing, for each voice command, the steps to execute when the voice command is invoked; and a description column 1304 optionally containing a description of each voice command. The table diagram shows table entry 1310, inserted by the facility in step 702 for the "view status" voice command. Entry 1046 specifies that the context of the voice command is the word processing application, called "Word". The entry also specifies that the name of the voice command is "view status". The entry further specifies performing the interactions shown in FIGS. 2–5 and selecting the contents of the entry's script. While the contents of the script are shown in a natural language narrative for the sake of clarity, scripts are preferably encoded to reduce the level of storage resources consumed by the voice command table. The entry finally specifies that the command is described as "open file status.doc as read-only". After step 702, the steps shown in FIG. 7 conclude.

Figure 14:
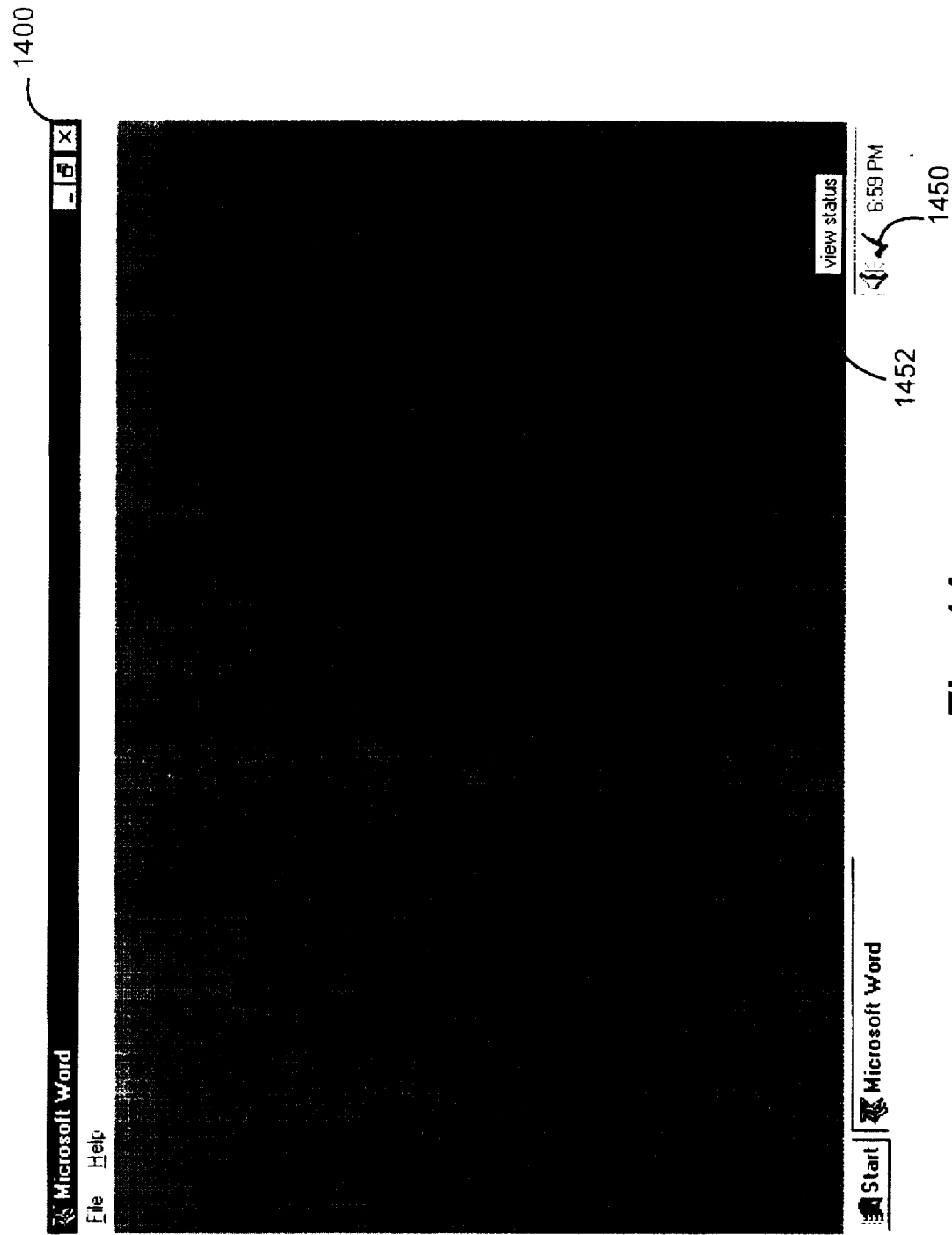
FIG. 14 is a screen diagram showing the user invoking the new voice command.

After the facility creates the new voice command, the user may invoke it to perform user interactions listed in its script. FIG. 14 is a screen diagram showing the user invoking the new voice command. FIG. 14 shows the word processing application displaying its window 1400. At this point, the user invokes the "view status" voice command by speaking the words "view status". In response, the facility displays indications 1450 and 1452 indicating that the "view status" voice command has been recognized. A "check mark" indicator 1450 indicates that a voice command was recognized, and a rectangle 1452 containing the text "view status" identifies the particular voice command recognized. In response to recognizing the "view status" voice command, the facility executes the script shown in voice command table entry 1310. The facility executes the script by sending messages mimicking the messages intercepted by the facility in step 701 (FIG. 7) corresponding to the selected interactions. The sent messages have the same contents as the original messages resulting from the actual interactions performed by the user shown in FIGS. 2–5. The messages are received and processed by applications and/or the operating system as they were in FIGS. 2–5. In a preferred embodiment, the facility more efficiently repeats selected high-level interactions by calling application programming interface (API) routines of the operating system instead of sending mimicking messages. The Microsoft Windows® event hooking mechanism may also be used to repeat interactions.

FIG. 15 is a screen diagram showing the execution of the script of the "view status" voice command in response to its recognition. It can be seen that the execution of the script achieves the same results as the original user interactions, shown in FIG. 6. That is, the status file is opened in read-only mode. The facility has therefore enabled the user to substitute the act of speaking a command name for the act of performing a potentially extensive sequence of user interactions that require acute vision and manual dexterity.

While this invention has been shown and described with reference to preferred embodiments, it will be understood by those skilled in the art that various changes or modifications in form and detail may be made without departing from the scope of the invention.

We claim:

1. A method in a computer system for creating a voice command that reproduces a sequence of user input events received in the computer system, the method comprising the steps of:

receiving in the computer system a plurality of user input events;

automatically storing a plurality of the received user input events;

receiving from the user an instruction to create a voice command from received user input events; and in response to receiving the instruction:

displaying a visual indication of each of a plurality of the stored user input events, permitting the user to select one or more user input events for which visual indications are displayed, receiving from the user a name for the voice command, and creating a voice command that reproduces the user input events selected by the user when audio data corresponding to the voice command name is received in the computer system.

2. The method of claim 1 wherein the step of displaying visual indication of each of a plurality of the stored user input events displays the indications in the order in which the user input events to which they correspond were received in the computer system.

3. The method of claim 1 wherein the instruction to create a voice command received in the step of receiving an instruction to create a voice command is a voice command.

4. A method in a computer system with which a user may perform interactions using one or more input devices, the method for creating a command that a user may invoke by a single interaction to simulate an ordered sequence of user interactions, the method comprising the steps of:

automatically maintaining a log comprised of indications of a plurality of interactions performed by the user;

receiving from the user an instruction to create a command;

in response to receiving an instruction to create a command, displaying at least a portion of the log;

receiving user input identifying interactions whose indications are displayed in the log that are to be automatically repeated when the created command is invoked; and creating a command that automatically repeats the identified interactions when invoked.

5. The method of claim 4, further including the steps of:

receiving an instruction from the user to invoke the created command, in response to receiving an instruction from the user to invoke the created command, invoking the created command to automatically repeat the identified interactions.

6. The method of claim 4 wherein one of the input devices that the user may use to perform interactions with the computer system is a voice command recognition system, and wherein the step of receiving from the user an instruction to create a command includes the step of receiving a voice command via the voice command recognition system.

7. The method of claim 4, further including the step of receiving from the user a name for the created command, and wherein the computer system includes a voice command input device, and wherein the creating step creates a voice command that is invoked when audio data is received via the voice command input device that corresponds to the received name.

8. The method of claim 7, further including the steps of:

receiving via the voice command input device audio data corresponding to the received name, in response to receiving via the voice command input device audio data corresponding to the received name, invoking the created command to automatically repeat the identified interactions.

9. The method of claim 4 wherein one of the input devices that the user may use to perform interactions with the computer system is text entry device, and wherein the maintaining step includes the step of including in the log indications of text entry interactions performed by the user using the text entry device.

10. The method of claim 4 wherein one of the input devices that the user may use to perform interactions with the computer system is a pointing device, and wherein the maintaining step includes the step of including in the log indications of pointing interactions performed by the user using the pointing device.

11. The method of claim 4 wherein the maintaining step includes the step of including in the log indications of menu selection interactions.

12. The method of claim 4 wherein the maintaining step includes the step of including in the log indications of window use interactions.

13. The method of claim 4 wherein the maintaining step includes the step of including in the log indications of interactions for selecting a new active application program.

14. An apparatus for creating a command that a user may invoke by a single user input event to regenerate one or more previously generated user input events, comprising:

one or more user input devices for generating user input events in response to actions by a user;

a user input module for receiving user input events generated by the user input devices;

a memory for automatically storing at least a portion of the user input events received by the user input module;

a display device for displaying visual representations of at least a portion of the received user input events stored in the memory;

a user input event selection system that receives user input events generated by the user input devices identifying one or more of the displayed visual representations and selects the user input events to which the identified visual representations correspond; and a command creation system that associates the selected user input events with an identifier, such that the selected indications and the identifier together constitute a command that a user may invoke by a single user input event to generate the selected user input events.

15. The apparatus of claim 14 wherein one of the user input devices is an audio input device that generates user input events containing audio data, further including a command processor for receiving input events containing audio data and, when it receives an input event containing audio data corresponding to the identifier, generates the selected user input events.

16. An instance of a computer-readable medium upon which is stored a computer program for creating a command that a user may invoke by a single interaction to simulate a combination of user interactions, wherein the computer program causes the computer system to:

automatically compile a list of the user interactions performed by the user;

when the user issues a create command instruction, display visual indications of a plurality of user interactions in the list and allows the user to select a combination of the displayed visual interactions; and create a command that simulates the selected combination of user interactions when invoked by a single user interaction.

17. The instance of a computer-readable medium of method 16, wherein the computer program further causes the computer system to create a voice command having a name selected by the user, the voice command simulating the selected combination of user interactions when audio data matching the command name is received.

18. A method in a computer system for creating a command that the user may invoke to simulate a series of user interactions at a time after the user, comprising the steps of:

(a) receiving user interactions intended by the user to accomplish an objective;

(b) as the user interactions are received,
  (1) processing the user interactions so as to accomplish the intended objective, and
  (2) recording the user interactions;

(c) after steps (a) and (b), receiving a request to create a command;

(d) in response to step (c), displaying indications of the recorded interactions;

(e) receiving user input selecting a series of recorded interactions from the displayed indications; and (f) creating a command that, when invoked, simulates the selected series of recorded interactions.

19. A method in a computer system for creating a command that the user may invoke to simulate a series of user interactions at a time after the user, comprising the steps of:

receiving user interactions;

after receiving the user interactions, receiving a request to create a command;

in response to the request, displaying a list of the received user interactions;

receiving user input selecting a portion of the displayed list of received user interactions; and creating a command that, when invoked, simulates the selected portion of recorded interactions.

* * * * *